United States Patent [19]

Faul et al.

[11] Patent Number: 5,661,220
[45] Date of Patent: Aug. 26, 1997

[54] REACTION PRODUCTS OF OLEFINICALLY UNSATURATED CARBOXYLIC ACIDS AND POLYETHEROLS AND THEIR USE AS DEMULSIFIERS FOR CRUDE OIL EMULSIONS

[75] Inventors: Dieter Faul, Bad Dürkheim; Joachim Roser, Mannheim; Heinrich Hartmann, Limburgerhof; Hans-Henning Vogel, Frankenthal; Wilhelmus Slotman, Ludwigshafen; Gerd Konrad, Limburgerhof, all of Germany

[73] Assignee: BASF Aktiengesellschaft, Ludwigshafen, Germany

[21] Appl. No.: 592,290

[22] PCT Filed: Jul. 28, 1994

[86] PCT No.: PCT/EP94/02487

§ 371 Date: Feb. 7, 1996

§ 102(e) Date: Feb. 7, 1996

[87] PCT Pub. No.: WO95/04771

PCT Pub. Date: Feb. 16, 1995

[30] Foreign Application Priority Data

Aug. 10, 1993 [DE] Germany .................. 43 26 772.6

[51] Int. Cl.⁶ .................. C08F 8/00; C08F 8/14
[52] U.S. Cl. .................. 525/384; 252/343; 252/331; 252/358; 525/385; 525/386; 526/320
[58] Field of Search .................. 252/343, 331, 252/358; 526/320; 525/384, 385, 386

[56] References Cited

U.S. PATENT DOCUMENTS

| | | | |
|---|---|---|---|
| 4,678,599 | 7/1987 | Fock | 252/343 |
| 5,156,767 | 10/1992 | Fitzgerald et al. | 252/342 |

FOREIGN PATENT DOCUMENTS

| | | |
|---|---|---|
| 1010740 | 5/1977 | Canada . |
| 0 264 841 | 4/1988 | European Pat. Off. . |
| 0 499 068 | 8/1992 | European Pat. Off. . |
| 1 566 863 | 5/1969 | France . |

*Primary Examiner*—Fred Zitomer
*Attorney, Agent, or Firm*—Oblon, Spivak, McClelland, Maier & Neustadt, P.C.

[57] ABSTRACT

Reaction products which are suitable as demulsifiers for crude oil emulsions, comprise olefinically unsaturated carboxylic acids and polyetherols and are obtainable by A) condensation of one or more unsaturated $C_3$–$C_{10}$-carboxylic acids or their derivatives of the general formula I

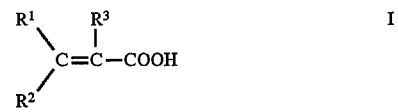

where $R^1$ and $R^2$ are each hydrogen, $C_1$–$C_4$-alkyl or carboxyl, $R^3$ is hydrogen or methyl and $R^1$ together with the carboxyl group may form a 5-membered or 6-membered anhydride ring, with a polyetherol of the general formula II $$R^4-O+R^5-O+_xH \qquad II$$

where $R^4$ is a radical of a monohydric or polyhydric alcohol or of a phenol or of an alkylphenol of 7 to 30 carbon atoms or a radical of an alkylphenol/formaldehyde or alkylphenol/acetaldehyde condensate, $R^5$ is a branched or straight-chain $C_2$–$C_4$-alkylene group, where different units [$R^5$-O] may be present within a polyalkylene oxide chain, and X is an integer of from 5 to 120, in a molar ratio of compounds II to I of from 2:1 to 10:1 and in a weight ratio of from 25:1 to 1,000:1, B) polymerization of the resulting condensate with one or more unsaturated carboxylic acids I and, if required, further olefinically unsaturated monomers copolymerizable with the carboxylic acids I, the amount of the carboxylic acids I being from 50 to 100 mol %, based on the amount of the olefinically unsaturated monomers, and the molar ratio of the polyetherol II to the sum of the olefinically unsaturated monomers used in process steps A) and B) being from 1:5 to 1:200, and subsequent C) condensation of the resulting reaction mixture, with the proviso that not all hydroxyl groups are converted, and a process for their preparation, mixtures of the reaction products with organic solvents and the use of the reaction products and of the mixtures as demulsifiers for crude oil emulsions.

17 Claims, No Drawings

REACTION PRODUCTS OF OLEFINICALLY UNSATURATED CARBOXYLIC ACIDS AND POLYETHEROLS AND THEIR USE AS DEMULSIFIERS FOR CRUDE OIL EMULSIONS

The present invention relates to reaction products of olefinically unsaturated carboxylic acids and polyetherols, obtainable by A) condensation of one or more unsaturated $C_3$–$C_{10}$-carboxylic acids or their derivatives of the general formula I

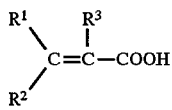

where $R^1$ and $R^2$ are each hydrogen, $C_1$–$C_4$-alkyl or carboxyl, $R^3$ is hydrogen or methyl and $R^1$ together with the carboxyl group may form a 5-membered or 6-membered anhydride ring, with a polyetherol of the general formula II

where $R^4$ is a radical of a monohydric or polyhydric alcohol or of a phenol or of an alkylphenol of 7 to 30 carbon atoms or a radical of an alkylphenol/formaldehyde or alkylphenol/acetaldehyde condensate, $R^5$ is a branched or straight-chain $C_2$–$C_4$-alkylene group, where different units [$R^5$-O] may be present within a polyalkylene oxide chain, and X is an integer of from 5 to 120, in a molar ratio of compounds II to I of from 2:1 to 10:1 and in a weight ratio of from 25:1 to 1,000:1, B) polymerization of the resulting condensate with one or more unsaturated carboxylic acids I and, if required, further olefinically unsaturated monomers copolymerizable with the carboxylic acids I, the amount of the carboxylic acids I being from 50 to 100 mol %, based on the amount of the olefinically unsaturated monomers, and the molar ratio of the polyetherol II to the sum of the olefinically unsaturated monomers used in process steps A) and B) being from 1:5 to 1:200, and subsequent C) condensation of the resulting reaction mixture, with the proviso that not all hydroxyl groups are converted.

The present invention furthermore relates to the preparation of these reaction products and to mixtures which contain reaction products. Finally, the present invention relates to the use of the reaction products as demulsifiers for crude oil emulsions.

In the production of crude oils, an increasing amount of water is simultaneously extracted with increasing exploitation of the deposits. Surfactants present in the crude oils emulsify the major part of the water, stable water-in-oil emulsions being formed. The emulsion water may contain dissolved salts which lead to corrosion problems during further processing of the crude oil in the refinery. Furthermore, high water contents in the crude oil result in higher transport costs between the oil field and the refinery. The emulsion water must therefore be separated off before transport or must be reduced below an acceptable concentration. This is generally effected by adding oil demulsifiers, heating of the crude oil facilitating and accelerating the separation.

Crude oils differ greatly in their composition depending on their origin. The natural emulsifiers present in the crude oils have different, relatively complicated chemical structures and compositions, so that selective oil demulsifiers must be developed to overcome their effect. As a result of the development of new oil fields and owing to changed production conditions in older fields, there is a constant need for novel demulsifiers which ensure more rapid separation into water and oil and very small amounts of residual water and hence residual salt.

Known demulsifiers are polymeric oil demulsifiers, which include polymers having a carbon main chain. According to Patent CA 10 10 740, unsaturated functions which are capable of undergoing free radical polymerization and are polymerized in solution in subsequent reaction with other monomers in defined ratios are introduced into alkoxylated alcohols and alkoxylated alkylphenol/formaldehyde resins by etherification with unsaturated diglycidyl compounds (e.g. glycidyl acrylate), by esterification with maleic anhydride or unsaturated acids or by transesterification with esters of unsaturated acids.

DE-C 33 38 923 describes products which are obtained from the copolymerization of polyoxyalkylene ethers of allyl or methallyl alcohol with vinyl esters or acrylates or methacrylates. All these products have action-specific or preparation-related weaknesses. For example, when glycidyl compounds are used for introducing the unsaturated functions, gels and inhomogeneities are frequently formed in the polymerization and poor copolymerization conditions occur in the case of derivatives of allyl alcohol, methallyl alcohol and maleic acid. Furthermore, gelling and solidification reactions frequently occur, in particular as the result of the use of polyfunctional starting alcohols in the alkoxylation.

U.S. Pat. No. 4,626,379 describes demulsifiers which are prepared by partial condensation of the reaction product of a mixture of at least two alkoxylated compounds with a vinylic monomer. Here, at least one of the alkoxylated compounds consists of a block copolymer prepared by polyaddition of a polyoxyalkylene glycol with a diglycidyl ether. The synthesis described here is complicated and the diepoxides used are relatively expensive raw materials.

DE-A 36 35 489 describes copolymers of hydrophobic acrylates or methacrylates and hydrophilic monomers. The hydrophobic esters are prepared by acid-catalyzed azeotropic esterification of alkoxylates of monohydric or polyhydric alcohols or alkylphenol/aldehyde condensates with (meth)acrylic acid. After the copolymerization of the hydrophobic esters with hydrophilic monomers, the free hydroxyl groups are converted into a form which is no longer reactive and/or the catalyst acid is neutralized with a tertiary amine. The preparation of these products is time-consuming since the esterification of the alkoxylate with (meth)acrylic acid requires several hours. In the esterification of alkoxylates of polyhydric alcohols, it is not possible selectively to prepare the monoester, so that, owing to the polyfunctional acrylates present, insoluble gels are readily formed in the copolymerization with hydrophilic monomers.

DE-A 41 04 610 describes polymeric demulsifiers which are obtained by polymerization of vinylic monomers in the presence of alkoxylates based on monohydric or polyhydric alcohols and a subsequent condensation reaction. Here, the vinylic monomers must carry suitable reactive groups which are capable of reacting with the OH functions of the alkoxylates. In practice, it has been found that the high efficiency and the producibility of these reaction products are very dependent on small quality differences in the alkoxylate used. Reproducible product properties can therefore be achieved only by very technically complicated means.

It is an object of the present invention to provide demulsifiers which permit very rapid separation of emulsions into water and oil and result in very small amounts of residual water, have a long shelf life and can be reproducibly prepared in a simple manner and especially without large quality fluctuations.

We have found that this object is achieved by the reaction products defined at the outset. We have also found a process for the preparation of these reaction products and furthermore mixtures of these compounds and the use of the reaction products and their mixtures as demulsifiers for crude oil emulsions.

Examples of vinylically unsaturated $C_3$–$C_{10}$-carboxylic acids or their derivatives I are acrylic acid, methacrylic acid, maleic acid, fumaric acid and maleic anhydride, among which acrylic acid is preferred.

The monomers I may be polymerized alone or in process step B) with comonomers. Suitable comonomers are aliphatic esters of the carboxylic acids I, such as methyl (meth)acrylate, ethyl (meth)acrylate, isobutyl methacrylate and lauryl acrylate, as well as $C_1$–$C_{20}$-hydroxyesters of the carboxylic acids I, such as hydroxyethyl (meth)acrylate, and amides and $C_2$–$C_{40}$-dialkylamides of the carboxylic acids I, such as acrylamide and those amides which carry further functional groups, such as 2-acrylamido-2-methylpropanesulfonic acid. Further examples of comonomers are $C_8$–$C_{12}$-arylvinyl compounds, such as styrene, $C_3$–$C_{10}$-alkenes, such as isobutene and trimethylpentene, unsaturated $C_3$–$C_8$-alcohols, such as allyl alcohol, vinyl esters of $C_2$–$C_{10}$-carboxylic acids, such as vinyl acetate and vinyl propionate, and $C_3$–$C_{20}$-alkylvinyl ethers, such as vinyl methyl ether.

Heterocyclic vinyl compounds, such as vinylimidazole and vinylpyrrolidone, are also suitable.

The polyetherols of the formula II which are to be used according to the invention are known per se or can be prepared by known methods.

The polyetherols (cf. for example DE-A 36 35 489, page 5) are prepared by reacting a mono- or polyfunctional alcohol with an alkoxide or a mixture of a plurality of alkoxides or blockwise with a plurality of alkoxides with the aid of basic catalysts, such as sodium hydroxide, at from 80° to 160° C. The ratio of alcohol to the alkoxides may vary greatly in preparation but is advantageously from 1:120 to 1:5. Preferred alkoxides are ethylene oxide, propylene oxide and 1,2-butylene oxide or mixtures thereof. Preferred alcohols are $C_1$–$C_{30}$-alkanols, e.g. ethanol, butanol, isopropanol, tallow fatty alcohol and stearyl alcohol. Other examples are $C_2$–$C_{30}$-polyalcohols: ethylene glycol, bisphenol A, glycerol, trimethylolpropane, pentaerythritol, sorbitol and polyglycerol.

Alkylphenols of the general formula III

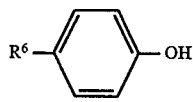

III where $R^6$ is, for example, methyl, isopropyl, tert-butyl, hexyl or nonyl, and the alkylphenol/formaldehyde or acetaldehyde condensates described below are also suitable.

Alkoxylated alkylphenol/formaldehyde or acetaldehyde condensates

The alkylphenol/formaldehyde or acetaldehyde resins used as alcohols for the alkoxylation are prepared in a conventional manner by reacting the aldehyde with the alkylphenol in a ratio of from 2:1 to 1:2 under base or acid catalysis at from 80° to 250° C. with the aid of a high-boiling solvent for complete azeotropic removal of the resulting water of reaction. The alkylphenols used are, for example, nonylphenol, tert-butyl phenol or octylphenol. In general, an alkylsulfonic acid or alkylbenzenesulfonic acid, e.g. dodecylbenzenesulfonic acid, is used as the catalyst.

In general, the molecules contain from 4 to 12, preferably from 5 to 9, aromatic nuclei.

The condensates thus obtained are alkoxylated as described above.

Process step A

The carboxylic acids or carboxylic acid derivatives I are condensed in the presence of a molar excess of polyetherol II, i.e. the acid or anhydride groups are esterified. The compounds II and I are present in a molar ratio of from 2:1 to 10:1, the weight ratio being from 25:1 to 1,000:1. The reaction may be carried out in the presence of an acidic catalyst, such as a lactic acid or an organic acid, e.g. paratoluenesulfonic acid, the amount of catalyst being in general from 0.5 to 4% by weight, based on the amount of polyetherol II. As a rule, the condensation is carried out in an inert solvent. Suitable solvents are aromatic hydrocarbons, such as toluene, xylene, and commercial, high-boiling mixtures of aromatics, as well as decalin. The amount of solvent is in general from 20 to 80% by weight, based on the total batch. The reaction may be carried out at from 60° to 200° C. for from 0.5 to 3 hours. As a rule, separation of the water formed may be dispensed with.

Process step B

The reaction mixture which is obtained after process step A) and essentially contains the condensate and unconverted polyetherol II is mixed with further olefinically unsaturated monomers for the polymerization, the molar ratio of the polyetherol II to the sum of the olefinically unsaturated monomers used in process steps A) and B) being from 1:5 to 1:200, preferably from 1:10 to 1:50. The amount of the carboxylic acids I is from 50 to 100, preferably from 75 to 100, mol %, based on the amount of the olefinically unsaturated monomers converted in this process step.

The polymerization is carried out by the known batchwise or continuous methods of free radical polymerization, such as mass, suspension, precipitation or solution polymerization, with initiation by conventional free radical donors, such as dicyclohexyl peroxydicarbonate, tert-butyl peroctoate, tert-butyl per-pivalate, 2,2'-azobisisobutyronitrile, dicumyl peroxide, di-tert-amyl peroxide, di-tert-butyl peroxide, cumyl hydroperoxide or tert-butyl hydroperoxide, and mixtures with one another. In general, these initiators are used in amounts of from 0.1 to 20, preferably from 0.2 to 15, % by weight, based on the monomers.

The polymerization is carried out, as a rule, at from 40° to 200° C., preferably from 60° to 150° C., in the course of from 0.5 to 10, preferably from 1 to 6, particularly preferably from 2 to 4, hours, superatmospheric pressure advantageously being employed when solvents having boiling points below the polymerization temperature are used. The polymerization is advantageously carried out in the absence of air, i.e. when it is not possible to work below boiling conditions, for example under nitrogen or carbon dioxide, since oxygen inhibits the polymerization. The reaction can be accelerated by the concomitant use of redox coinitiators, such as benzoin, dimethylaniline, ascorbic acid and chromium complexes soluble in organic solvents. The amounts usually used are from 0.1 to 2,000, preferably from 0.1 to 1,000, ppm by weight.

In order to obtain low molecular weight copolymers, it is often advantageous to carry out the reaction in the presence of regulators. Examples of suitable regulators are allyl alcohols, such as but-1-en-3-ol, and organic mercapto compounds, such as 2-mercaptoethanol, 2-mercaptopropanol, mercaptoacetic acid, mercaptopropionic acid, tert-butyl mercaptan, n-butyl mercaptan, n-octyl mercaptan, n-dodecyl mercaptan and tert-dodecyl mercaptan, which are generally used in amounts of from 0.1 to 10% by weight.

Apparatuses suitable for the polymerization are, for example, conventional stirred kettles with, for example, anchor stirrers, paddle stirrers, impeller stirrers or multistage impulse countercurrent agitators and, for the continuous preparation, stirred kettle cascades, tube reactors and static mixers.

A simple method for the preparation of the novel polymers is solution polymerization. It is carried out in solvents in which the monomers and the copolymers formed are soluble. All solvents which meet these requirements and do not react with the monomers are suitable for this purpose.

For example, these are aromatic and alkyl-substituted aromatic hydrocarbons, such as toluene, xylene, ethylbenzene, cumene, high-boiling mixtures of aromatics, e.g. SOLVESSO (petroleum solvent) 100, 150 and 200, aliphatic and cycloaliphatic hydrocarbons, such as n-hexane, cyclohexane, methylcyclohexane, n-octane, isooctane, decalin, liquid paraffins and SHELLSOL (petroleum solvent) TD, T and K, and acetone, cyclohexanone, tetrahydrofuran and dioxane, tetrahydrofuran and dioxane being particularly suitable for obtaining low molecular weight copolymers.

Since the demulsifiers for crude oil emulsions are surfactants which should be soluble in the continuous phase (oil phase) of the crude oil emulsion, it is advantageous to choose for the polymerization a solvent which is compatible with the emulsion, so that the demulsifier solution can be added directly to the emulsion. The solution polymerization is the preferred form of preparation of the novel copolymers.

In carrying out the solution polymerization, it is advantageous initially to take the reaction mixture from process step (A) and to meter in the monomers with the initiator and, if required, coinitiator, regulator and solvent. The monomers may also be metered in individually and at different rates. This is advisable in the case of monomers having very different reactivities and if a particularly uniform distribution of the less reactive monomer is desired. The less reactive monomer is metered in more rapidly and the more reactive monomer more slowly. It is also possible initially to take the total amount of one monomers, preferably of the less reactive monomer, and to meter in only the more reactive one. Finally, it is also possible initially to take all components and to meter in only the initiator and, if required, coinitiator and regulator (batch procedure). However, when this procedure is carried out on a larger scale, problems may occur with the removal of heat, so that this procedure should be used only in the case of low concentrations of the monomers to be polymerized.

Process step C

After the polymerization is complete, the reaction mixture thus obtained is subjected to a condensation.

In this process step, some of the free hydroxyl groups of the polyetherol are reacted with some of the reactive groups of the polymer of the vinylic monomers (for example, acrylic acid or its esters). This gives rise to bridges, with the result that very active demulsifiers are formed. The composition of the polyetherol and of the vinylic monomers and the reaction conditions must be chosen so that completely oil-soluble end products are obtained. Furthermore, in the condensation step, all hydroxyl groups of the alkoxylate must not be converted, otherwise insoluble products would form; instead, low conversions are generally sufficient for achieving the desired effect. With regard to their use as demulsifiers, products which have proven particularly useful are those whose acid number after the condensation is from 70 to 100, whose hydroxyl number is from 2 to 20 and whose K value (according to H. Fikentscher, Cellulosechemie 13 (1932), 58–64 and 71–74, determined in 2% strength solution in xylene) is from 10 to 50, preferably from 14 to 30.

The preferred reaction in the condensation step is the esterification.

The condensation is carried out as a rule at from 80° to 250° C., preferably from 100° to 200° C., particularly preferably from 120° to 180° C., in the course of from 0.5 to 10, preferably from 1 to 8, particularly preferably from 2 to 6, hours in the melt or in solution. If the boiling point of the solvent is below the desired condensation temperature, the condensation is carried out under pressure.

To carry out the condensation step, the reaction mixture from process step B) is brought to the desired temperature. In some cases, it is advantageous to remove low molecular weight reaction products (for example water or low molecular weight alcohols) from the reaction vessel. This can be effected, for example, by passing in an inert gas over the polymer melt or by using an entraining agent. If it is intended, for example, to remove water from the reaction mixture, suitable entraining agents are the conventional organic solvents which form an azeotropic mixture with water, in particular xylene or toluene. The condensation can be accelerated by adding catalysts, in particular acidic catalysts, such as mineral acids, e.g. sulfuric acid and hydrochloric acid, sulfonic acids, such as p-toluenesulfonic acid and dodecylbenzenesulfonic acid, or acidic ion exchangers. If a catalyst acid is added, it may be neutralized after the end of the condensation step. All basic compounds are in principle suitable for this purpose. However, amines, such as triethylamine, ethylhexylamine, tributylamine, morpholine, piperidine or ethanolamines, are preferably used. At least the stoichiometric amount of base required for neutralization of the catalyst acid is added. However, a larger amount of base may also be added. In this case, some or all of the remainder of the acidic groups introduced by the vinylic monomers, especially carboxyl groups which originate from the carboxylic acid I, are also neutralized. By the correct choice of the base and of the degree of neutralization, the efficiency of the demulsifiers can be adapted to the crude oil emulsions.

The novel reaction products may also be used as a mixture with other demulsifiers, for example those based on alkoxylated amines. It is also possible to use the novel polymers as a mixture with organic solvents, for example alcohols, such as n-butanol, isopropanol, n-propanol, n-butanol, sec-butanol, tert-butanol, octanols, etc. The amount of the alcohols is preferably from 2 to 10% by weight, based on the solids content of the mixtures.

The novel reaction products have a high demulsification rate when used as demulsifiers in crude oil emulsions and can be prepared in a very reproducible manner.

EXAMPLES

1. Polyetherols

In the Examples below, the meanings are as follows:

A1: Block copolymer of 1 mol of propylene glycol reacted with (on average) 47.4 mol of propylene oxide and then with (on average) 20.0 mol of ethylene oxide (=Example a3 from EP 264 841).

A2: Block copolymer of 1 mol of trimethylolpropane reacted with (on average) 60.0 mol of propylene oxide and then with (on average) 10.0 mol of ethylene oxide (=Example a5 from EP 264 841).

A3: Block copolymer of 1 mol of trimethylolpropane reacted with (on average) 80.0 mol of propylene oxide and then with (on average) 30.3 mol of ethylene oxide (=Example a15 from EP 264 841).

2. Preparation of the novel reaction products
General preparation method 5.5 g of toluenesulfonic acid were added to II and the mixture was heated to 100° C. After the addition of a g of acrylic acid, the reaction mixture was kept at this temperature for one hour. At 90° C., I was then added in the course of 2.5 hours and b g of tert-butyl peroctanoate in c g of solvent were metered in simultaneously. After one hour at 100° C., milky cloudy polymer solutions were obtained.

These polymer solutions were heated at the boil for 3.5 hours, water being removed azeotropically. The products were cooled to room temperature, after which d g of n-butanol and e g of solvent were added.

Tables 1 and 2 below show the amounts and starting materials, their molar and weight ratios and characteristic data of the products.

TABLE 1

| Example | II | a | I | b | c | d | e |
|---|---|---|---|---|---|---|---|
| B 1 | 700 g Al 479 g xylene | 2.8 | 250 g AA 240 g xylene | 2.6 | 237 xylene | 48 | 326 xylene |
| B 2 | 700 g Al 479 g xylene | 5.5 | 238 g AA 240 g xylene | 2.5 | 237 xylene | 48 | 326 xylene |
| B 3 | 700 g Al 479 g xylene | 1.4 | 242 g AA 240 g xylene | 2.5 | 237 xylene | 48 | 326 xylene |
| B 4 | 304 g Al 208 g decalin | 1.2 | 110 g AA 112 g decalin | 1.1 | 93 decalin | 21 | 141 decalin |
| B 5 | 700 g Al 479 g xylene | 2.8 | 225 g AA 25 g LA 240 g xylene | 2.5 | 237 xylene | 48 | 326 xylene |

AA = Acrylic acid
LA = Lauryl acrylate

3. COMPARATIVE EXAMPLE 1 (V1)

(=Example B1 from EP 264 841):

A solution of 244 g of polyetherol A2 in 110 g of xylene was heated with 4.8 g of acrylic acid, 0.048 g of hydroquinone monoethyl ether and 5 g of p-toluenesulfonic acid for 5 hours at 150° C. 1.1 ml of water were thus removed. The acrylate obtained in this manner had a residual acid number of 4.1. 182 g of xylene and 43 g of acrylic acid were added to the acrylate solution thus prepared and the mixture was heated to 70° C. under a nitrogen atmosphere. A solution of 2.5 g in 85 g of xylene was then metered in over 2 hours, after which polymerization was continued for a further hour at this temperature. A clear brown solution having a K value of 12.6 was obtained. Water was then removed azeotropically for 2 hours under reflux, the mixture was cooled to room temperature and 15 g of n-butanol were added (product V1).

COMPARATIVE EXAMPLE 2 (V2)

(=Example B14 from DE 4104610):

A solution of 342 g of A3 in 126 g of xylene was heated to 70° C. in a gentle stream of nitrogen, and a solution of 57.9 g of acrylic acid and 14.5 g of ethyl acrylate was metered in over 2 hours and a solution of 1.45 g of azobisisobutyronitrile in 50 g of xylene was simultaneously metered in uniformly. Thereafter, stirring was continued for a further hour at 70° C. An oily, milky solution was obtained. 1.9 g of p-toluenesulfonic acid were added to this polymer solution and the mixture was refluxed for 2 hours (140° C.). It was then cooled and 1.7 g of morpholine were added (product V2).

4. Test of the demulsifier efficiency

The demulsifier efficiency of the novel polymers was tested using a crude oil emulsion from R ühlermoor/Georgsdorf. For this purpose, an active ingredient concentration of 8 ppm, based on the solids content, of the corresponding demulsifier was added while stirring the emulsion, and water separation was monitored in a measuring cylinder as a function of time. The temperature of 50° C. required for optimum demulsification was achieved by placing the measuring cylinder in a thermostated water bath. The numerical values shown in the Table correspond to the percentage of water separated off, based on the total water content of the emulsion (=100%).

TABLE 2

| | Process step A Ratio II:I | | Process step B | | Process step C | | |
|---|---|---|---|---|---|---|---|
| Example | Molar | Weight | Proportion of I, based on monomers | Molar ratio of II to monomers from A and B | Acid number [mg KOH/g] | Hydroxyl number [mg KOH/g] | K value |
| B 1 | 5:1 | 253:1 | 100 mol % | 1:18 | 89 | 13 | 20 |
| B 2 | 2.5:1 | 127:1 | 100 mol % | 1:18 | 87 | 5 | 21 |
| B 3 | 10:1 | 507:1 | 100 mol % | 1:18 | 87 | 7 | 19 |
| B 4 | 5:1 | 253:1 | 100 mol % | 1:18 | 87 | 6 | 23 |
| B 5 | 5:1 | 253:1 | 96.8 mol % | 1:18 | 80 | 6 | 21 |

TABLE 3

| | Demulsifier efficiency | | | | | | |
|---|---|---|---|---|---|---|---|
| Product from Example | Amount of water separated off, in % after minutes | | | | | | |
| | 10 | 20 | 30 | 45 | 60 | 120 | 240 |
| B1 | 4 | 8 | 34 | 80 | 96 | 100 | 100 |
| B2 | 0 | 2 | 16 | 49 | 71 | 78 | 80 |
| B3 | 2 | 9 | 27 | 67 | 73 | 78 | 80 |

TABLE 3-continued

| | Demulsifier efficiency | | | | | | |
|---|---|---|---|---|---|---|---|
| Product from | Amount of water separated off, in % after minutes | | | | | | |
| Example | 10 | 20 | 30 | 45 | 60 | 120 | 240 |
| B4 | 2 | 7 | 27 | 82 | 98 | 98 | 100 |
| B5 | 2 | 7 | 20 | 68 | 91 | 96 | 99 |
| V1 | 0 | 0 | 2 | 2 | 4 | 53 | 62 |
| V2 | 0 | 0 | 0 | 0 | 2 | 7 | 20 |

The Examples show that the novel demulsifiers lead to substantially better separation of water in the same time than the prior art demulsifiers.

We claim:

1. A reaction product having a hydroxyl number from 2 to 20, prepared by a process comprising:

(A) condensing (1) one or more unsaturated $C_3$–$C_{10}$-carboxylic acids of the formula I or anhydrides thereof

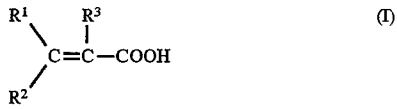

where $R^1$ and $R^2$ are each hydrogen, $C_1$–$C_2$-alkyl or carboxyl, $R^3$ is hydrogen or methyl and $R^1$ together with the carboxyl group may form a 5-membered or 6-membered anhydride ring, with (2) a polyetherol II obtained by reacting a polyvalent alcohol, an alkylphenol/formaldehyde/condensate or an alkylphenol/acetaldehyde/condensate with 5 to 120 mol of one or several branched or straight-chain $C_2$–$C_4$-alkyleneoxides per mol of said polyvalent alcohol, alkylphenol/formaldehyde/condensate or alkylphenol/acetaldehyde/condensate, wherein several alkyleneoxides may be reacted in a mixture or blockwise, in a molar ratio of compounds II to I of from 2:1 to 10:1 and in weight ratio of from 25:1 to 1000:1 at temperatures of from 60° to 100° C. for 0.5 to 1 hour to form a condensate and unreacted polyetherol II, (B) polymerizing said condensate and unreacted polyetherol II with one or more unsaturated carboxylic acids of formula I and, optionally additional olefinically unsaturated monomers copolymerizable with said unsaturated carboxylic acid of formula I, the amount of said carboxylic acid being from 50 to 100 mol % based on the amount of the olefinically unsaturated monomers, the molar ratio of said polyetherol II to the sum of the olefinically unsaturated monomers used in process steps (A) and (B) being from 1:5 to 1:200 to form a reaction mixture, and subsequently (C) condensing said reaction mixture, with the proviso that not all hydroxyl groups are reacted.

2. The reaction product of claim 1, wherein said olefinically unsaturated carboxylic acid of formula I is selected from the group consisting of acrylic acid, methacrylic acid, maleic acid, fumaric acid, maleic anhydride and mixtures thereof.

3. The reaction product of claim 1, wherein said olefinically unsaturated carboxylic acid of formula I comprises 50–100 mol % acrylic acid.

4. The reaction product of claim 1, wherein said alkyleneoxide is ethylene oxide, propylene oxide or a mixture thereof.

5. The reaction product of claim 1, wherein the amount of said carboxylic acid in step (B) is 75–100 mol % based on the amount of the olefinically unsaturated monomers.

6. The reaction product of claim 1, wherein step (C) is conducted at 80°–250° C. for 0.5–10 hours in a melt or in solution.

7. The reaction product of claim 6, wherein step (C) is conducted at a temperature of 100°–200° C.

8. The reaction product of claim 6, wherein step (C) is conducted at a temperature of 120°–180° C.

9. The reaction product of claim 6, wherein step (C) is conducted for 1–8 hours.

10. The reaction product of claim 6, wherein step (C) is conducted for 2–6 hours.

11. The reaction product of claim 1, wherein said reaction product is oil-soluble.

12. A process for preparing a reaction product having a hydroxyl number from 2–20; comprising the steps of:

(A) condensing (1) one or more unsaturated $C_1$–$C_{10}$-carboxylic acids of the formula I or anhydrides thereof

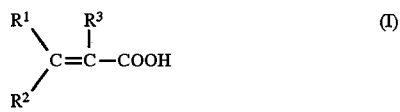

where $R^1$ and $R^2$ are each hydrogen, $C_1$–$C_2$-alkyl or carboxyl, $R^3$ is hydrogen or methyl and $R^1$ together with the carboxyl group may form a 5-membered or 6-membered anhydride ring, with (2) a polyetherol II obtain by reacting a polyvalent alcohol, an alkylphenol/formaldehyde/condensate or an alkylphenol/acetaldehyde/condensate with 5 to 120 mol of one or several branched or straight-chain $C_2$–$C_4$-alkyleneoxides per mol of said polyvalent alcohol, alkylphenol/formaldehyde/condensate or alkylphenol/acetaldehyde/condensate, wherein several alkyleneoxides may be reacted in a mixture or blockwise, in a molar ratio of compounds II to I of from 2:1 to 10:1 and in weight ratio of from 25:1 to 1000:1 at temperatures of from 60° to 100° C. for 0.5 to 1 hour to form a condensate and unreacted polyetherol II, (B) polymerizing said condensate and unreacted polyetherol II with one or more unsaturated carboxylic acids of formula I and, optionally additional olefinically unsaturated monomers copolymerizable with said carboxylic acid of formula I, the amount of said unsaturated carboxylic acid being from 50 to 100 mol % based on the amount of said olefinically unsaturated monomers, the molar ratio of the polyetherol II to the sum of said olefinically unsaturated monomers used in process steps (A) and (B) being from 1:5 to 1:200 to form a reaction mixture, and subsequently (C) condensing said reaction mixture, with the proviso that not all hydroxyl groups are reacted.

13. The process of claim 12, wherein step (C) is conducted at 80°–250° C. for 0.5–10 hours in a melt or in solution.

14. The process of claim 13, wherein step (C) is conducted at a temperature of 100°–200° C.

15. The process claim 13, wherein step (C) is conducted at a temperature of 120°–180° C.

16. The process of claim 13, wherein step (C) is conducted for 1–8 hours.

17. The process of claim 13, wherein step (C) is conducted for 2–6 hours.

* * * * *